Figure 1:
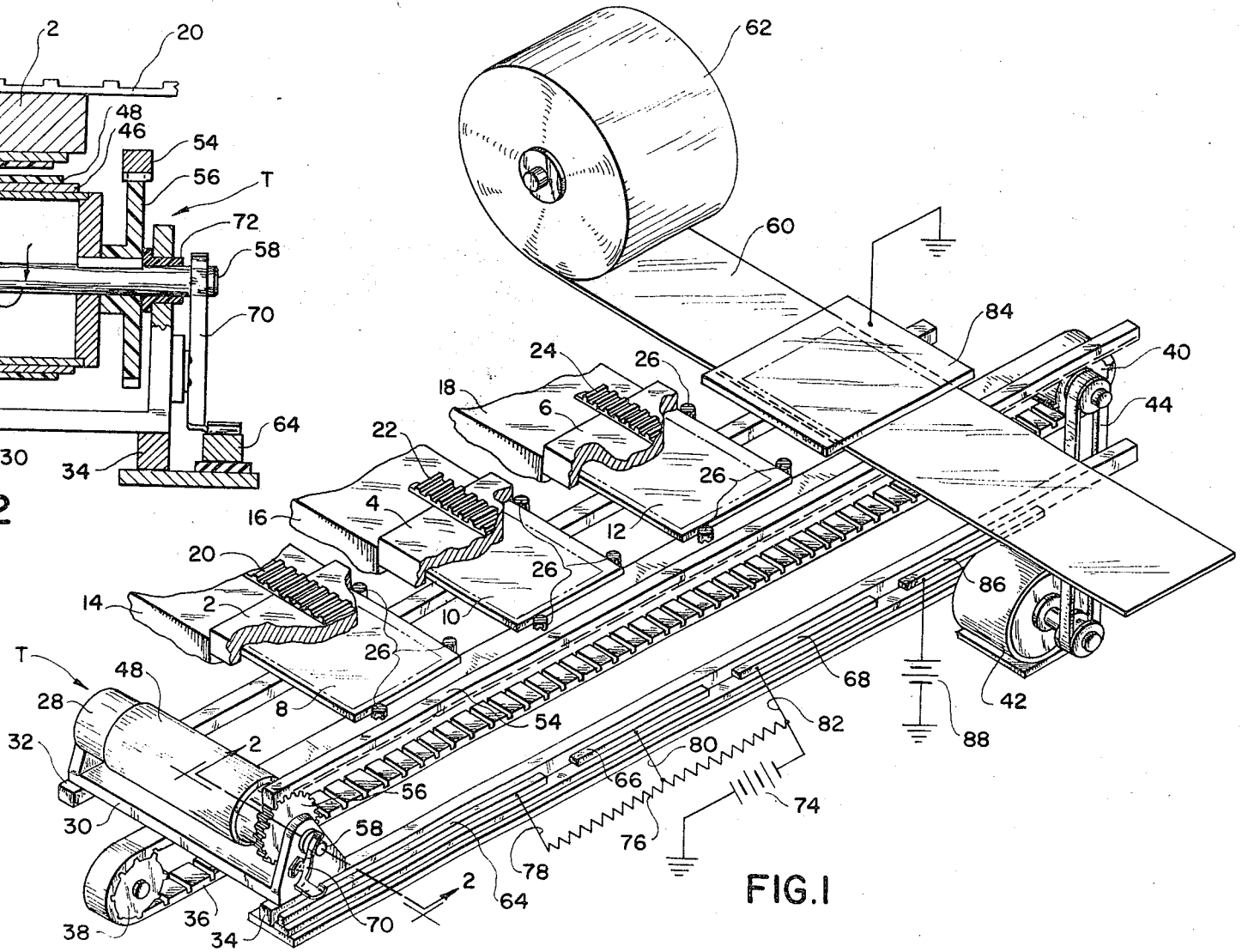
Figure 2:
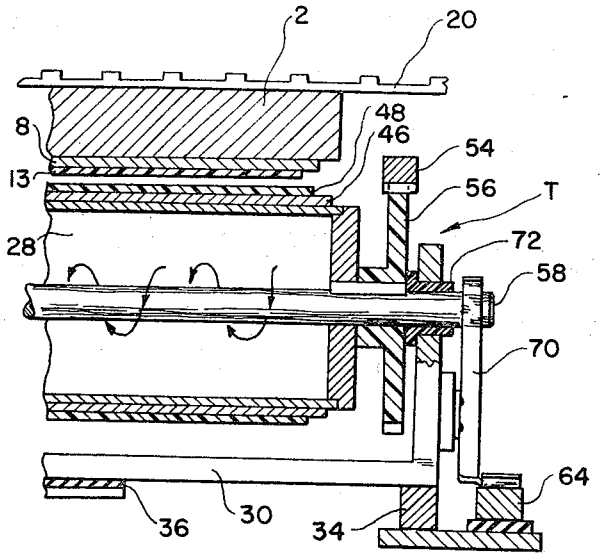

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 16, 1970

875 O.G. 362

T875,018
OFFSET PRINTING DEVICE
Oliver W. Gnage, 901 Elmgrove Road, Rochester, N.Y. 14650
Filed Dec. 5, 1969, Ser. No. 882,642
Int. Cl. B41f *3/34*
U.S. Cl. 101—252
1 Sheet Drawing. 7 Pages Specification

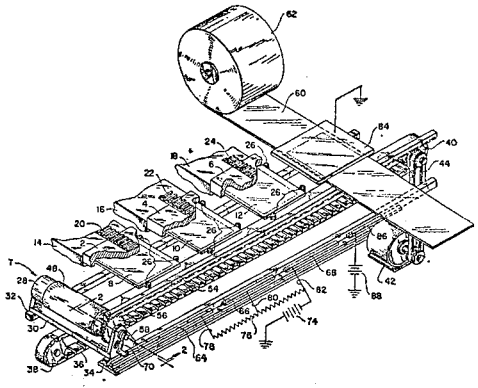

A device for offset electrostatic printing is provided wherein an offset transfer member in the form of a roller or a roller segment is moved along a path past a plurality of transfer stations, each station having an electrostatic liquid toned image, for example, one of three color separation images, which is transferred to the offset transfer member. These images are transferred sequentially and in registry and subsequently are transferred all together to a receiver. A potential may be applied to the offset member which is opposite the charge on the electrostatic toner to facilitate each transfer. A potential may be applied to the receiver which is opposite that on the offset transfer member to facilitate transfer of the registered toner images from the offset transfer member to the receiver. The offset transfer device may comprise an aluminum transfer roller having a Teflon coating, which roller is rotatably supported in a carriage. The carriage is driven along a path past a plurality of transfer stations. A rack extends along the path which engages and turns a pinion which in turn rotates the transfer roller as it is moved along the path.

June 16, 1970 O. W. GNAGE T875,018

OFFSET PRINTING DEVICE

Filed Dec. 5, 1969

OLIVER W. GNAGE
INVENTOR.

BY Gary D. Fields
Robert W. Hampton
ATTORNEYS